United States Patent [19]
Champetier et al.

[11] Patent Number: 5,874,711
[45] Date of Patent: Feb. 23, 1999

[54] APPARATUS AND METHOD FOR DETERMINING THE TEMPERATURE OF A RADIATING SURFACE

[75] Inventors: Robert J. Champetier, Scotts Valley, Calif.; Avner Man, Carmiel, Israel; Arnon Gat, Palo Alto, Calif.; Ram Z. Fabian, Haifa, Israel

[73] Assignee: AG Associates, San Jose, Calif.

[21] Appl. No.: 843,925

[22] Filed: Apr. 17, 1997

[51] Int. Cl.⁶ .................................................. H05B 1/02
[52] U.S. Cl. ..................... 219/497; 219/502; 219/121.43; 356/45; 359/359; 392/416
[58] Field of Search ....................... 219/497, 501, 219/505, 502, 121.43, 494; 118/724; 356/43–45; 359/350, 359; 392/416, 418

[56] References Cited

U.S. PATENT DOCUMENTS

| | | |
|---|---|---|
| 4,919,542 | 4/1990 | Nulman et al. . |
| 5,114,242 | 5/1992 | Gat et al. . |
| 5,154,512 | 10/1992 | Schietinger et al. . |
| 5,165,796 | 11/1992 | Gat et al. . |
| 5,188,458 | 2/1993 | Thompson et al. . |
| 5,226,732 | 7/1993 | Nakos et al. . |
| 5,249,142 | 9/1993 | Shirakawa et al. . |
| 5,255,286 | 10/1993 | Moslehi et al. . |
| 5,271,084 | 12/1993 | Vandenabeele et al. . |
| 5,305,416 | 4/1994 | Fiory . |
| 5,308,161 | 5/1994 | Stein . |
| 5,442,727 | 8/1995 | Fiory . |
| 5,443,315 | 8/1995 | Lee et al. . |
| 5,444,815 | 8/1995 | Lee et al. . |
| 5,467,220 | 11/1995 | Xu . |
| 5,624,590 | 4/1997 | Fiory . |
| 5,628,564 | 5/1997 | Nenyei et al. . |
| 5,660,472 | 8/1997 | Peuse et al. . |

FOREIGN PATENT DOCUMENTS

0612862A1  8/1994  European Pat. Off. .

OTHER PUBLICATIONS

Honda, et al.; New Radiation Thermometry Using Multiple Reflection for Temperature Measurement of Steel Sheets; pp. 923–927; 1992; New York.

Yamamoto, et al.; Radiation Thermometry Method Using Multi–reflection Between Two Parallel Steel sheet Surfaces; pp. 933–938; 1992; New York.

Krapez, et al.; Reflective–cavity Temperature Sensing for Process Control; pp. 877–882; 1992; New York.

Neuer, et al.; Thermal Analysis of the Different Methods of Multiwavelength Pyrometry; pp. 787–789; 1992; New York.

Yamada, et al.; Radiation Thermometry for Simultaneous Measurement of Temperature and Emissivity; pp. 843–847; 1992; New York.

*Primary Examiner*—Mark H. Paschall
*Attorney, Agent, or Firm*—Dority & Manning, P.A.

[57] ABSTRACT

The present invention is generally directed to a system and process for accurately determining the temperature of an object, such as a semiconductive wafer, by sampling from the object radiation being emitted at a particular wavelength. In particular, a reflective device is placed adjacent to the radiating object. The reflective device includes areas of high reflectivity and areas of low reflectivity. The radiation being emitted by the object is sampled within both locations generating two different sets of radiation measurements. The measurements are then analyzed and a correction factor is computed based on the optical characteristics of the reflective device and the optical characteristics of the wafer. The correction factor is then used to more accurately determine the temperature of the wafer. Through this method, the emissivity of the wafer has only a minor influence on the calculated temperature.

29 Claims, 3 Drawing Sheets

Fig. 3

APPARATUS AND METHOD FOR DETERMINING THE TEMPERATURE OF A RADIATING SURFACE

FIELD OF THE INVENTION

The present invention is generally directed to a method and to an apparatus for measuring the temperature of a surface without contacting the surface. More particularly, the present invention is directed to a method and apparatus for determining the temperature of a surface by reflecting the thermal radiation emitted by the surface and then sensing the reflected radiation at a plurality of locations. Specifically, the reflected radiation emitted by the surface is sampled at a plurality of locations where the amount of reflectivity has been varied.

BACKGROUND OF THE INVENTION

The accurate measurement of surface temperatures of hot objects is of concern in many industrial and scientific processes. For instance, temperatures must be accurately measured during the processing and melting of metals and glasses, during the heat treatment of semiconductors, and during the fabrication of circuit chips. In particular, the accurate determination of the temperature of semiconductor wafers is especially needed during rapid thermal processing of the wafers, during rapid thermal oxidation, or during other processes which modify or add thin chemical films or coatings to the surface of the wafers. For these critical semiconductor fabrication processes, it is essential that the temperature be known within a few degrees over a range which may extend from less than 400° C. to over 1,100° C.

In the past, the temperature of hot objects was determined either using (1) contact methods or (2) non-contact methods. For instance, during contact methods, the hot object is contacted with a sensor such as a thermocouple that is in turn connected to a temperature meter, which indicates the temperature of the object. Conventional non-contact methods of determining temperature, on the other hand, include using a light sensor such as an optical pyrometer that senses the thermal radiation being emitted by the object at a particular wavelength of light. Once the thermal radiation being emitted by the object is known, the temperature of the object can be estimated.

When processing semiconductor materials for use in the electronics industry, it is far preferable to use non-contact methods when measuring the temperature of semiconductor wafers. For instance, one advantage of non-contact methods is that the wafer can be spun slowly during the heating process so that the temperature is more uniform over the surface of the wafer. Rotating the wafer also promotes more uniform contact between the flow of processing gases and the wafer. Besides being able to rotate the wafers, another advantage to using non-contact methods is that, since no temperature gauges need be attached to the wafer, the wafers can be processed much more quickly saving precious time during semiconductor fabrication.

For all of the high temperature wafer processes of current and foreseeable interest, one of the more important requirements is that the true temperature of the wafer be determined with high accuracy, repeatability and speed. The ability to accurately measure the temperature of a wafer has a direct payoff in the quality and size of the manufactured semiconductor devices. For instance, the smallest feature size required for a given semiconductor device limits the computing speed of the finished microchip. The feature size in turn is linked to the ability to measure and control the temperature of the device during processing. Thus, there is increasing pressure within the semiconductor industry to develop more accurate temperature measurement and control systems.

In this regard, the chief disadvantage of conventional non-contact optical pyrometry systems for determining temperature is that the systems measure an apparent temperature rather than the true temperature of the wafer. In particular, a real surface emits radiation less efficiently than an ideal or perfect blackbody. Through theory and calculation, once the emitted radiation of a blackbody is known, the temperature of the blackbody can be calculated. A real body, however, such as a wafer, emits only a fraction of the radiation that would be emitted by a blackbody at the same temperature. This fraction is defined as the emissivity of the real object. Thus, when sensing the radiation being emitted by a real body, a pyrometer generally indicates an apparent temperature that is lower than the true temperature of the object.

Thus, in order to measure the true temperature of a real body using a pyrometer, the indicated temperature must be corrected to account for the emissivity. Unfortunately, the emissivity of a real body is generally unknown and is very difficult to measure accurately. Further, the emissivity of semiconductor wafers varies from wafer to wafer. The emissivity is a property of the surface and depends on several parameters, such as the chemical composition of the wafer, the thickness of the wafer, the surface roughness of the wafer, and the wavelength at which the pyrometer operates.

In the past, others have attempted to approximate the emissivity of a semiconductor wafer or to otherwise minimize its impact on temperature measurements using a pyrometer. For instance, one method for approximating the temperature of a silicon wafer using a pyrometer is to first determine the emissivity of the wafer or of a similarly constructed wafer using a temperature thermocouple in a separate process. This method, however, is not efficient. Further, it has been found that the emissivity of silicon wafers, even if they are similarly constructed, can vary widely from wafer to wafer.

Besides attempting to determine the emissivity of a wafer, other methods attempt to diminish the effect of not knowing the emissivity by using emissivity enhancement techniques. During these techniques, the object is to artificially increase the emissivity of the wafer to a value very close to unity which causes the wafer to simulate a blackbody allowing for more accurate temperature readings. For instance, one known emissity enhancement technique is to place a highly reflective sheet parallel to the semiconductor wafer as disclosed in a published European Patent Application having Publication No. 0612862 entitled: "Measuring Wafer Temperatures" by Gronet et al. and in U.S. Pat. No. 5,226,732 to Nakos et al. which are both incorporated herein by reference.

By placing a reflective sheet next to the wafer, the radiation emitted by the wafer reflects multiple times. The multiple reflections between the wafer and the reflective sheet cause the radiation between the two surfaces to add up and approximate the radiation of a perfect blackbody at the temperature of the wafer. This has the effect of enhancing the emissivity of the wafer to a value close to unity, allowing for more accurate temperature measurements.

For instance, according to Planck's law the radiation emitted by a blackbody at a particular wavelength ($\lambda$) and temperature (T) is as follows:

$$R_{bb} = \left(\frac{C_1}{\lambda^5}\right)\left(\frac{1}{e^{\frac{c_2}{\lambda T}} - 1}\right) \quad (1)$$

wherein $C_1$ and $C_2$ are well known constants. The radiation emitted by a real surface, such as a wafer, with an emissivity (E), on the other hand, is as follows:

$$R_w = E R_{bb} \quad (2)$$

When a reflective sheet is placed adjacent to the wafer, at a distance between the reflective sheet and the wafer which is vanishingly small, an infinite series of rays are created which have increasing numbers of reflections. A pyrometer sensing the multiple reflections would measure a total radiation emitted by the wafer as follows:

$$R_w = E R_{bb}[1 + \rho_r \rho_w + (\rho_r \rho_w)^2 \ldots] \quad (3)$$

wherein $\rho_r$ is the reflectivity of the reflective sheet and $\rho_w$ is the reflectivity of the wafer.

Because the geometric series contained in the brackets above simplifies to $1/(1-\rho_r \rho_w)$ and because, according to Kirchhoff's law $E = 1 - \rho_w$, the radiation emitted by the wafer can be stated as follows:

$$R_w = R_{bb}\left(\frac{1 - \rho_w}{1 - \rho_r \rho_w}\right) \quad (4)$$

Finally, if the reflectivity of the reflective sheet ($\rho_r$) is nearly 100%, i.e., 1, then the above equation reduces to $$R_w = R_{bb} \quad (5)$$

However, if the distance between the wafer and the reflective sheet is increased to several millimeters, as can be necessary in a practical system, the value of the enhanced radiation measured by the pyrometer as described above, is still dependent on the emissivity of the wafer's surface and on the reflectivity of the reflective sheet. Thus, better results are achieved when the starting emissivity of the wafer is already high. In particular, the above methods are not reliable when the wafer's emissivity is low, such as in the range of from about 0 to about 0.3. Consequently, the implementation of known emissivity enhancing techniques as described above have good but limited payoffs. This in turn restricts the accuracy with which the true temperature of the wafer can be determined, which in turn limits the performance and accuracy of the wafer processing system.

SUMMARY OF THE INVENTION

The present invention recognizes and addresses the foregoing disadvantages, and others of prior art constructions and methods.

Accordingly, it is an object of the present invention to provide an improved system and process for measuring the temperature of a radiating body without contacting the body.

Another object of the present invention is to provide a method and system for determining the temperature of an object by sensing the thermal radiation emitted by the object at a particular wavelength.

It is another object of the present invention to provide a method and system of determining the temperature of an object by reflecting the thermal radiation being emitted by the object and then measuring the reflected radiation at a plurality of locations including locations of high reflectivity and locations of low reflectivity.

Still another object of the present invention is to provide a system for processing semiconductor wafers that monitors the temperature of the wafer and, based on temperature determinations, controls the amount of heat supplied to the wafer.

It is another object of the present invention to provide a method and system of determining the temperature of a semiconductor wafer while exposing the wafer to light energy.

These and other objects of the present invention are achieved by providing an apparatus for measuring the temperature of an object. The apparatus includes a chamber adapted to receive an object. A reflective device is contained within the chamber and is positioned so as to be placed adjacent to the object when received within the chamber. The reflective device is configured to reflect thermal radiation being emitted by the object between a surface of the object and a surface of the reflective device. The reflective device includes at least a first area and a second area. The first area has a greater reflectivity than the second area.

The apparatus further includes a radiation sensing device for sensing the thermal radiation being reflected by the reflective device at a plurality of locations. In particular, the radiation sensing device senses thermal radiation within the first area and within the second area of the reflective device for determining the temperature of the object.

In one embodiment, the apparatus can further include a heat source in communication with the chamber for heating objects contained within the chamber. The heat source can include at least one lamp. The heat source can be separated from the chamber by a filter which substantially prevents light at a preselected wavelength from entering the chamber. The radiation sensing device, which can include a plurality of pyrometers, can be configured to sense thermal radiation at the preselected wavelength.

The apparatus can also include a control system, such as a microprocessor, in communication with the radiation sensing device and with the heat source. The controller can be configured to receive thermal radiation information from the radiation sensing device and, based on this information, to control the amount of heat being emitted by the heat source.

The reflective device can be made from a substrate coated within the first area with a first dielectric film and coated within the second area by a second dielectric film. Alternatively, the second area can be defined by an opening located within the first dielectric film. In a further embodiment, the reflective device can include a plate having a highly reflective surface. The second area of the reflective device can then be created by placing a partial light transmitting mirror over a portion of the reflective surface.

In one preferred embodiment, the reflective device includes a highly reflective surface. At least one and preferably two small zones or areas of lower reflectivity are located on the surface. The highly reflective surface can have a reflectivity of greater than about 0.9, while the areas of low reflectivity can have a reflectivity of from about 0.2 to about 0.7.

These and other objects of the present invention are also achieved by providing a method for measuring the temperature of a radiating body. The method includes the steps of positioning a reflective device adjacent to a surface of a radiating body. The reflective device includes a reflective surface facing the surface of the radiating body. The reflective surface includes a first area having a first reflectivity and a second area having a second reflectivity, wherein the first reflectivity is greater than the second reflectivity. The reflective surface causes thermal radiation being emitted by the radiating body to reflect between the surface of the radiating body and the reflective surface.

The method further includes the step of sensing the thermal radiation being emitted by the radiating body within the first area and within the second area of the reflective surface. By measuring the thermal radiation within areas having different reflectivities, the temperature of the radiating body can be accurately estimated.

In one preferred embodiment, the thermal radiation being emitted by the radiating body is sensed at a preselected wavelength. For instance, the thermal radiation being sensed can be within a wavelength range of from about 2.7 microns to about 2.8 microns.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a method and to a system for determining and controlling the temperature of a radiating body. It is believed that the principles of the present invention are applicable to a wide variety of processes contained in different fields. In one embodiment, as will be described hereinafter, the present invention is particularly well suited to determining the temperature of wafers made from a semiconductive material. Specifically, the system can be used during heat treatment of the wafers, during oxidation of the wafers, or during other processes which modify or add films to the surface of the wafers.

The present invention is generally directed to calculating the temperature of a wafer or object without contacting the wafer or object. The temperature of the object is determined by measuring the thermal radiation being emitted by the object at a particular wavelength. According to the present invention, the emissivity of the object is artificially increased when taking radiation measurements in order to provide more accurate temperature determinations.

More particularly, the present invention is directed to placing a reflective device adjacent to the object, causing radiation emitted by the object to reflect between a surface of the object and the reflective device. As described above, simply using a reflective device, however, provides results that are dependent on the starting emissivity of the surface of the object, on the reflectivity of the reflective device and on the geometry and dimensions of both. To remedy this problem, the present invention is directed to sampling the radiation being emitted by the object in two or more zones where the reflectivity of the reflective device has been modified.

For instance, according to the present invention, the reflective device which is normally highly reflective, includes one or more areas or zones of lower reflectivity. Thermal radiation being emitted by the object is sampled not only in a high reflective area but also in a low reflective area, generating at least two different radiation measurements. By obtaining at least two radiation measurements at areas of high reflectivity and at areas of lower reflectivity, a refinement in the enhancement of the emissivity of the object is achieved for more accurately estimating the temperature of the object.

Figure 1:
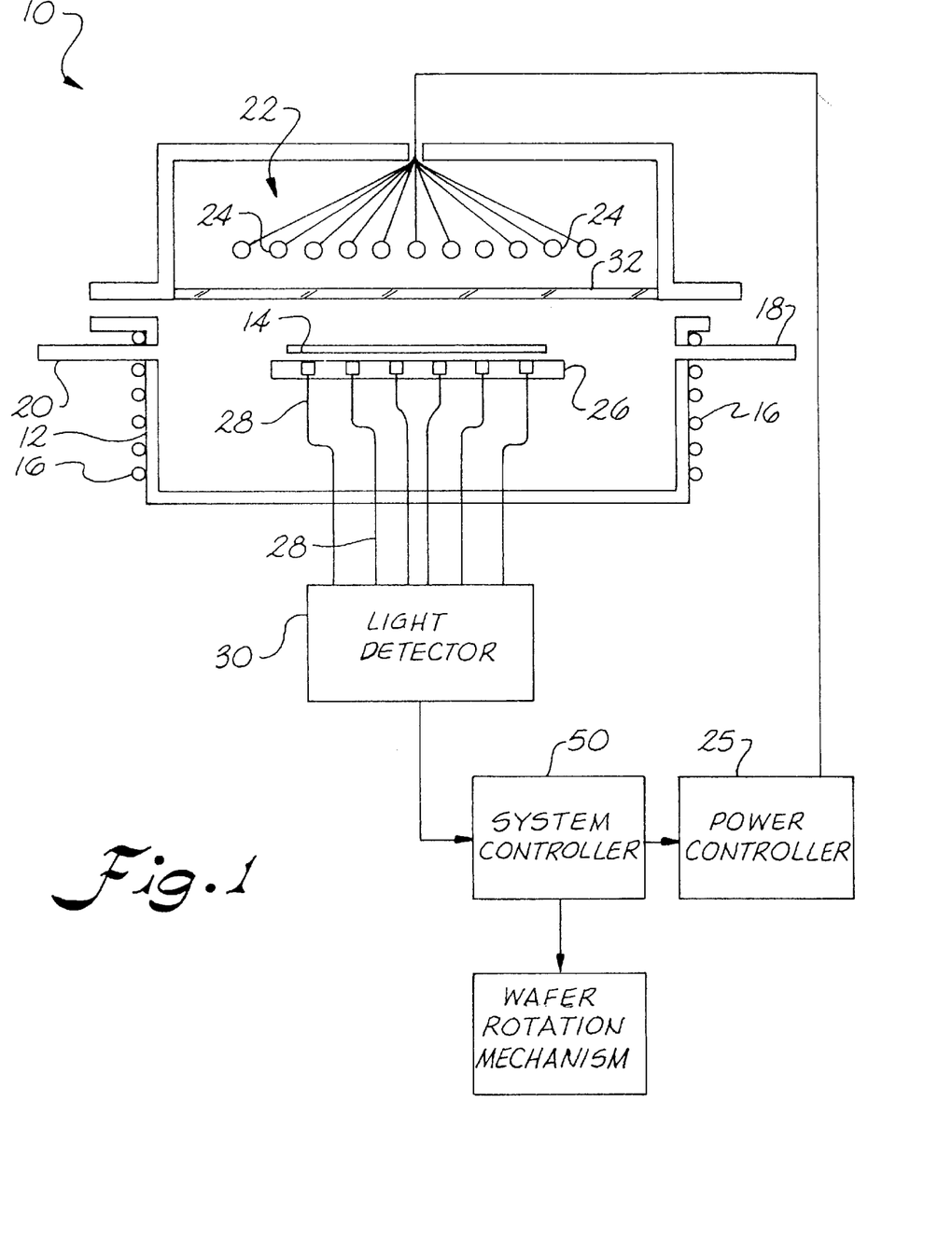
FIG. 1 is a side view of one embodiment of a system for measuring and controlling the temperature of a semiconductor wafer in accordance with the present invention.

Referring to FIG. 1, a system generally 10 made in accordance with the present invention for determining and controlling the temperature of a wafer made from a semiconductive material, such as silicon, is illustrated. System 10 includes a processing chamber 12 adapted to receive substrates such as a wafer 14 for conducting various processes. Chamber 12 is designed to heat wafer 14 at very rapid rates and under carefully controlled conditions. Chamber 12 can be made from various materials, including metals and ceramics. For instance, chamber 12, in one embodiment, can be made from stainless steel.

When chamber 12 is made from a heat conductive material, preferably the chamber includes a cooling system. For instance, as shown in FIG. 1, chamber 12 includes a cooling conduit 16 wrapped around the perimeter of the chamber. Conduit 16 is adapted to circulate a cooling fluid, such as water, which is used to maintain the walls of chamber 12 at a constant temperature.

Chamber 12 can also include a gas inlet 18 and a gas outlet 20 for introducing a gas into the chamber and/or for maintaining the chamber within a preset pressure range. For instance, a gas can be introduced into chamber 12 through gas inlet 18 for reaction with wafer 14. Once processed, the gas can then be evacuated from the chamber using gas outlet 20.

Alternatively, an inert gas can be fed to chamber 12 through gas inlet 18 for preventing any unwanted or undesirable side reactions from occurring within the chamber. In a further embodiment, gas inlet 18 and gas outlet 20 can be used to pressurize chamber 12. A vacuum can also be created in chamber 12 when desired, using gas outlet 20 or an additional larger outlet positioned beneath the level of the wafer.

During processing, chamber 12, in one embodiment, can be adapted to rotate wafer 14. Rotating the wafer promotes greater temperature uniformity over the surface of the wafer and promotes enhanced contact between wafer 14 and any gases introduced into the chamber. It should be understood, however, that besides wafers, chamber 12 is also adapted to process optical parts, films, fibers, ribbons, and other substrates having any particular shape.

A heat source generally 22 is included in communication with chamber 12 for heating wafer 14 during processing. In this embodiment, heat source 22 includes a plurality of lamps 24, such as tungsten-halogen lamps. Heat source 22 can include a reflector or set of reflectors, for carefully directing thermal energy being emitted by the heat source onto wafer 14 at particular locations. As shown in FIG. 1, lamps 24 are placed above wafer 14. It should be understood, however, that lamps 24 may be placed at any particular location. Further, additional lamps could be included within system 10 if desired.

The use of lamps 24 as heat source 22 is generally preferred. For instance, lamps have much higher heating and cooling rates than other heating devices, such as electrical elements or conventional furnaces. Lamps 24 create a rapid isothermal processing system that provide instantaneous energy, typically requiring a very short and well controlled start up period. The flow of energy from lamps 24 can also be abruptly stopped at any time. As shown in the figure, lamps 24 are equipped with a gradual power controller 25 that can be used to increase or decrease the thermal energy being emitted by the lamps.

In accordance with the present invention, contained within chamber 12, adjacent to wafer 14, is a reflective device 26. Reflective device 26 is connected to a plurality of optical fibers or light pipes 28 which are, in turn, in communication with a light detector 30 as shown in FIG. 1. Alternatively, optical fibers 28 may be connected to a plurality of light detectors. Optical fibers 28 are configured to receive thermal energy being emitted by wafer 14 at a particular wavelength. The amount of sensed radiation is then communicated to light detector 30 which generates a usable voltage signal for determining the temperature of the wafer. In one embodiment, optical fiber 28 in combination with light detector 30 comprises a pyrometer.

Figure 2:
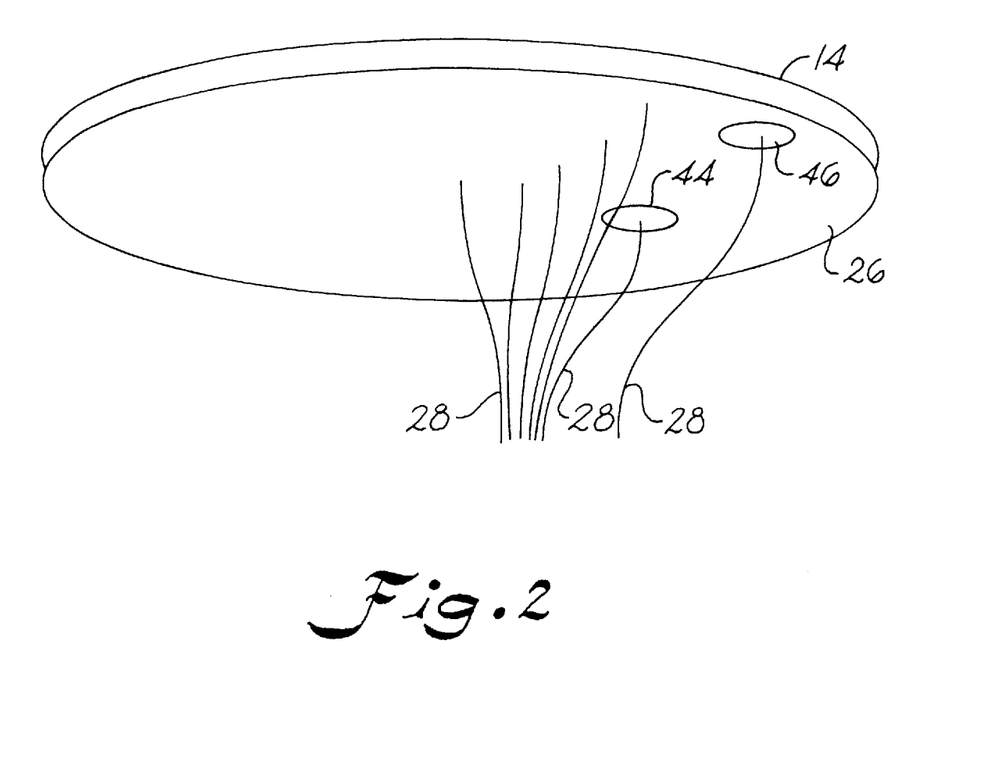
FIG. 2 is a perspective view of a reflective device positioned adjacent to a semiconductor wafer used in determining the temperature of the wafer in accordance with the present invention.
Figure 3:
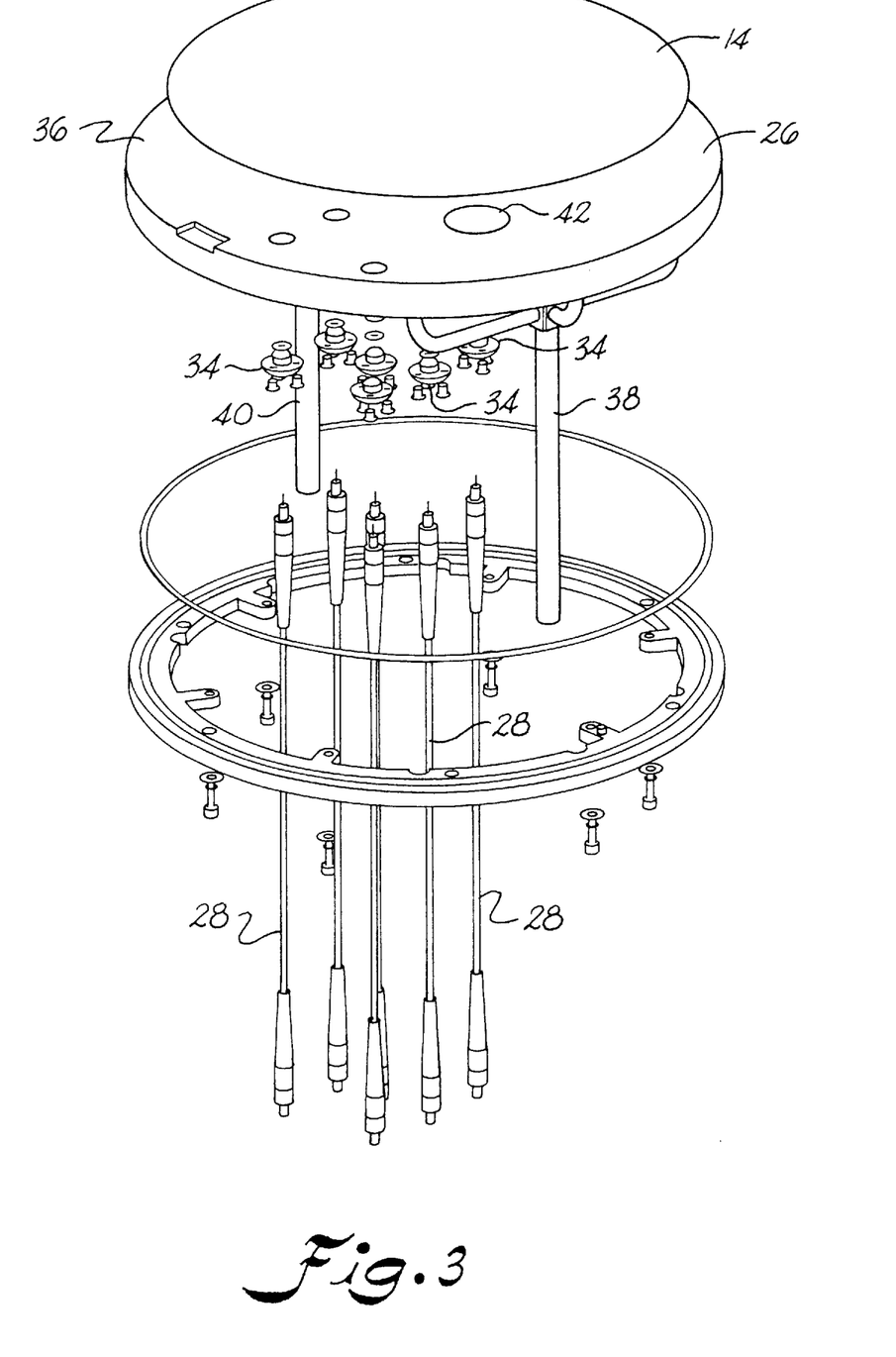
FIG. 3 is a detailed perspective view of a reflective device made in accordance with the present invention shown in combination with a plurality of optical fibers and positioned adjacent to a semiconductor wafer.

Reflective device 26 and optical fibers 28 are more clearly shown in FIGS. 2 and 3. In general, reflective device 26 is designed to reflect the thermal radiation being emitted by wafer 14 at the wavelength at which light detector 30 operates. Reflective device 26 causes the radiation being emitted by wafer 14 to reflect multiple times between a surface of wafer 14 and a surface of reflective device 26. As a result, optical fibers 28 sense more thermal radiation than that which is actually being emitted by the wafer.

During the process of the present invention, system 10 should be designed such that optical fibers 28 only detect thermal radiation being emitted by wafer 14 and not detect radiation being emitted by lamps 24. In this regard, system 10 includes a filter 32 which prevents thermal radiation being emitted by lamps 24 at the wavelength at which light detector 30 operates from entering chamber 12. Filter 32 as shown in FIG. 1 can be a window positioned between chamber 12 and heat source 22. In an alternative embodiment, each lamp 24 can be covered by a separate filter.

In one embodiment, filter 32 is made from fused silica or quartz. Fused silica is known to absorb thermal radiation very effectively at selected wavelengths. For instance, synthetic fused silica is very effective at absorbing light at a wavelength of from approximately 2.7 micrometers to about 2.8 micrometers. Thus, in one embodiment, when filter 32 is made from synthetic fused silica, light detector 30 can be configured to detect thermal radiation being emitted by wafer 14 at a wavelength of about 2.7 micrometers.

Fused silica or fused quartz is also known to be effective at absorbing radiation at a wavelength of about 5 micrometers. Operating at a wavelength range of from about 2.7 micrometers to about 2.8 micrometers, however, is preferable. This wavelength range is the shortest wavelength where strong absorption occurs in the silica. Further, silica is most effective within this range, absorbing greater than 95% of the radiation.

As shown in FIG. 3, optical fibers 28 can be connected to reflective device 26 by a coupling 34. Once connected to reflective device 26, optical fibers 28 are positioned on a reflective surface 36 of reflective device 26 for sensing radiation emitted by wafer 14.

In order to cool the reflective device during heat treatment of wafer 14, reflective device 26 includes a cooling fluid inlet 38 and a cooling fluid outlet 40. More particularly, reflective device 26 can include a hollow cavity in communication with inlet 38 and outlet 40 into which a cooling fluid, such as water, can be circulated. In some applications, it is necessary to cool reflective device 26 in order to prevent the reflective device from becoming damaged. For instance, if reflective device is made from dielectric materials as will be described in more detail hereinafter, the device should not be heated to temperatures greater than about 400° C. Higher temperatures may also tend to lower the reflectivity of reflective surface 36.

In general, reflective surface 36 should be placed as close as possible to wafer 14 in order to increase the amount that the thermal radiation being emitted by the wafer is reflected. Since reflective device 26 is typically at a lower temperature than wafer 14, however, placing the reflective device too close to the wafer may interfere with the heating process or may prevent the wafer from being heated at a uniform rate. The choice of the distance or spacing between wafer 14 and reflective device 26 depends upon the size of wafer 14. For wafers measuring 200 mm in diameter, in general reflective device 26 can be spaced from about 3 mm to about 15 mm from wafer 14. More particularly, for this wafer size, reflective device 26 is typically spaced from wafer 14 a distance of from about 6 mm to about 8 mm. A larger degree of spacing may be preferable for larger wafers.

As described above, reflective surface 36 of reflective device 26 generally has a very high reflectivity, preferably greater than 0.9 at the wavelength at which radiation is sampled by optical fibers 28 and light detector 30. In accordance with the present invention, reflective device 26 further includes at least one area or zone of lower reflectivity which is used to more accurately determine the temperature of wafer 14. As shown in FIG. 3, reflective device 26, in this embodiment, includes an area 42 having a lower reflectivity than the remainder of reflective surface 36. In FIG. 2, on the other hand, reflective device 26 includes a first area 44 and a second area 46 of lower reflectivity. In this embodiment, area 46 is positioned towards the edge of reflective device 26 while area 44 is positioned midway between the center and the edge of the reflective device.

According to the method of the present invention, optical fibers 28 and light detector 30 sample the radiation being emitted by wafer 14 not only within areas of high reflectivity of reflective surface 36 but also within the areas of lower reflectivity such as at 42 in FIG. 3 and at 44 and 46 as shown in FIG. 2. The signals generated by light detector 30 at the various locations are then analyzed electronically and a correction is computed. The correction is based on an analysis of the optical characteristics of the reflector within areas of high reflectivity, within areas of low reflectivity, and of the wafer itself. The result of the correction is that the inherent emissivity of the wafer has a very minor influence on the corrected readings. The method is also insensitive to small temperature differences in the wafer at the locations where the readings are taken. Ultimately, the method provides for fast, accurate and reproducible temperature measurements of the wafer.

When taking radiation measurements of a wafer or object at different locations and at different reflectivities according to the present invention, the following represents one manner in which the temperature of the wafer can be calculated. It should be understood, however, that it is believed that other mathematical algorithms may exist which may also lead to accurate temperature determinations using the method of the present invention.

According to equation four (4) provided above, the following represents the radiation emitted by a wafer when a reflective surface is placed adjacent to the wafer:

$$R_w = R_{bb} \left( \frac{1 - \rho_w}{1 - \rho_r \rho_w} \right) \quad (6)$$

In the present invention a further measurement of the radiation being emitted by the wafer is also taken at an area of low reflectivity. This measurement can be labeled $R_a$ and can be stated as follows:

$$R_a = R_{bb} \left( \frac{1 - \rho_w}{1 - \rho_a \rho_w} \right) \quad (7)$$

wherein $\rho_a$ represents the lower reflectivity.

As stated above, according to Kirchhoff's law, $\rho_w = 1 - E$. Substituting this equation into equations 4 and 5 above gives:

$$R_w = R_{bb} \frac{E}{1 - (1 - E)\rho_r} \quad (8)$$

$$R_a = R_{bb} \frac{E}{1 - (1 - E)\rho_a} \quad (9)$$

Dividing the radiation sampled in the area of low reflectivity with the radiation sampled in the area of high reflectivity gives the following, assuming that the reflectivity $\rho_r$ is equal to 1:

$$\frac{R_a}{R_w} = \frac{E}{1 - (1 - E)\rho_a} \quad (10)$$

If the emissivity (E) is solved for in the above equation, the following result is obtained:

$$E_x = \frac{\frac{R_a}{R_w}(1 - \rho_a)}{1 - \frac{R_a}{R_w}\rho_a} \quad (11)$$

wherein the emissivity is labeled $E_x$ in order to show that it is an approximation.

From the above equation, a correction factor can be derived. In particular, the correction factor is a factor to be multiplied by the radiation that is measured in the highly reflective area of the reflective device. The correction factor is a factor that improves the ability to determine the temperature of the wafer by minimizing emissivity dependence. The correction factor in this embodiment is as follows:

$$\frac{1 - \rho_{eff}(1 - E_x)}{E_x} \quad (12)$$

wherein $\rho_{eff}$ is the reflectivity of the reflective device that minimizes the emissivity dependence of the corrected radiation to be calculated from actual radiation readings. In most applications, $\rho_{eff}$ will have a value very close to the value of the reflectivity of the reflective device in the highly reflective area. The value of $\rho_{eff}$ is affected, however, by the presence of a gap between the wafer and reflective device, and by the distance from a particular optical fiber to the edge of the wafer or to the edge of the reflective device.

From equation 12 above, the corrected radiation is as follows:

$$R_{cor} = \frac{1 - \rho_{eff}(1 - E_x)}{E_x} R_w \quad (13)$$

wherein $R_{cor}$ is the corrected radiation signal calculated from the radiation measured in the highly reflective areas ($R_w$). Substituting in the value for $E_x$ as stated in equation 11 above, results in the following:

$$R_{cor} = \left[ 1 + \frac{(1 - \rho_{eff})\left(\frac{R_w}{R_a} - 1\right)}{(1 - \rho_a)} \right] R_w \quad (14)$$

Examining the correction factor in brackets above, it can be seen that the correction factor depends on the ratio of $(1 - \rho_{eff})$ to $(1 - \rho_a)$. Consequently, in the derived algorithm above, there will not be a unique solution covering all applications for $\rho_{eff}$ and for $\rho_a$. Further, $\rho_a$ will need to be estimated in order to account for some interference radiation that will be sensed in the areas of low reflectivity that originates from areas of high reflectivity. There will be, however, a particular solution for any $\rho_{eff}$ and $\rho_a$ which has the same ratio $(1 - \rho_{eff})/(1 - \rho_a)$ that produces a least square fit.

In other words, according to the solution derived above, the system will need to be calibrated for the particular application. For instance, if the system of the present invention were to process silicon wafers, data can first be obtained from a few wafers having known properties. These data can then be incorporated into equation 14 in order to approximate the variables $\rho_{eff}$ and $\rho_a$ using a least square fit method. Once these variables are then determined, the system will be capable of accurately determining the temperature of other wafers having similar properties. Thus far, it has been found that this calibration step can be completed using initially as few as four (4) wafers with widely varying values of emissivity.

Referring back to FIG. 1, as shown, system 10 further includes a system controller 50 which can be, for instance, a microprocessor. Controller 50 receives voltage signals from light detector 30 that represent the radiation amounts being sampled at the various locations. Based on the signals received from light detector 30, controller 50 is configured to calculate the temperature of wafer 14 based on the above mathematical relationships.

System controller 50 as shown in FIG. 1 can also be in communication with lamp power controller 25. In this arrangement, controller 50 can calculate the temperature of wafer 14, and, based on the calculated information, control the amount of thermal energy being emitted by lamps 24. In this manner, instantaneous adjustments can be made regarding the conditions within reactor 12 for processing wafer 14 within carefully controlled limits.

In one embodiment, controller 50 can also be used to automatically control other elements within the system. For instance, controller 50 can be used to control the flow rate of gases entering chamber 12 through gas inlet 18. As shown, controller 50 can further be used to control the rate at which wafer 14 is rotated within the chamber.

Referring to FIGS. 2 and 3, the construction of reflective device 26 and specifically of reflective surface 36 will now be discussed. According to the present invention, as described above, reflective surface 36 is highly reflective, preferably having a reflectivity greater than 0.9, at the wavelength at which optical fiber 28 and light detector 30 operate. Reflective surface 36, however, also includes zones or areas of reduced reflectivity such as indicated at 44 and 46 in FIG. 2. In general, the reflectivity within areas 44 and 46 should be less than 0.9 and can be, for instance, between about 0.2 to about 0.7. More particularly, thus far, good results have been obtained when the reflectivity within areas 44 and 46 is from about 0.3 to about 0.5 at the wavelength of interest.

The size and the amount of zones or areas of lower reflectivity located on reflective device 26 will depend upon the particular application. In general, the temperature of wafer 14 can be estimated more precisely the greater the number of zones or areas appearing on reflective device 26. The zones or areas of lower reflectivity, however, may interfere with the heating process of the wafer. In particular, the zones or areas may lower the temperature of the wafer at adjacent locations. Thus, the size and amount of the zones of lower reflectivity should be controlled to prevent such adverse interference.

In one preferred embodiment, as illustrated in FIG. 2, reflective device 26 includes two areas 44 and 46 of lower reflectivity. Further, when using a reflective device having approximately a 10 inch diameter, areas 44 and 46 can have, in this embodiment, a diameter of from about 1 inch to about 2 inches.

Reflective surface 36 of reflective device 26 can be made from various materials. In one preferred embodiment, reflective surface 36 is formed by coating a metallic substrate, such as stainless steel, with a dielectric film. The dielectric film can be a multi-layer optical film specially designed to have the appropriate reflectivity at the desired wavelength. Such films are known in the art and can be obtained from Deposition Sciences, Inc. of Santa Rosa, Calif.

Besides dielectric films, reflective surface 36 can also be made from highly polished metals coated with a clear protective coating, such as a clear dielectric coating. Such metals include gold, silver, and nickel. However, for a particular desired wavelength, metal surfaces are typically not as reflective as the dielectric films described above. Also, the metals may cause contamination within processing chamber 12 when heated to high temperatures.

The zones or areas of lower reflectivity appearing on reflective surface 36 can also be created according to numerous methods. For instance, in one embodiment, when reflective surface 36 is made from a dielectric film, areas 44 and 46 can also be made from a dielectric film. In particular, the dielectric film used to construct areas 44 and 46 can have a lower reflectivity than the dielectric film used to construct reflective surface 36.

In an alternative embodiment, holes or openings can be carved into reflective surface 36 for creating the areas of lower reflectivity. The openings may go all the way through reflective device 26 or may, alternatively, for instance, be carved into a dielectric film exposing the substrate underneath.

For example, in one embodiment, reflective surface 36 can be constructed by coating a stainless steel substrate with a multi-layer dielectric film. The areas of low reflectivity may then be formed into the surface by carving openings into the multi-layer film and exposing the stainless steel substrate underneath.

Although placing openings within reflective device 26 is very effective at providing areas of lower reflectivity, such openings may interfere with the heating process of wafer 14. For instance, such openings may have a greater tendency to create lower temperature areas on the wafer than if the lower reflectivity areas were created by a separate film or composition on the reflective surface.

In a further alternative embodiment, the areas of lower reflectivity located on reflective surface 36 can be created by mirrors that only partially transmit radiation therethrough. Such mirrors could be placed above reflective surface 36. More particularly, a mirror could be positioned such that the radiation reflected off the mirror would be sent to a remote location within the chamber, while the radiation filtering through the mirror would be focused upon a small area on reflective surface 36. If desired, in this embodiment, the mirror could rotate with wafer 14 or could be configured to move to different locations below wafer 14 for lowering the reflectivity upon reflective surface 36 within different areas.

The present invention may be better understood with reference to the following example.

EXAMPLE

The following test was performed in order to demonstrate the effectiveness of the process of the present invention in determining the temperature of a semiconductive wafer.

Four (4) silicon wafers with known emissivities were placed in a thermal processing chamber and heated. Within the thermal processing chamber, each wafer was placed adjacent to a reflective plate. The reflective plate was made from a stainless steel substrate that was coated on a surface adjacent the wafer with dielectric films. In particular, a large area of the surface of the stainless steel substrate was coated with a highly reflective dielectric film having an apparent reflectivity of approximately 97% for light at a wavelength of about 2.7 microns.

In accordance with the present invention, the surface of the reflective plate also included a small zone having a lower reflectivity. The low reflective zone, which had a diameter of approximately 1 inch, was made from a second dielectric film. The dielectric film used to make the low reflective zone had a reflectivity of approximately 30% to 40% for light at a wavelength of about 2.7 microns.

Once each wafer was placed in the thermal processing chamber, the true temperature of the wafer was monitored with a thermocouple. Each of the wafers was heated to a temperature of 823° C. While at this temperature, a first pyrometer sensed the thermal radiation being emitted by the wafer in the highly reflective region on the reflective plate. A second pyrometer monitored the thermal radiation being emitted by the wafer within the low reflective zone. Each pyrometer sensed thermal radiation at a wavelength of about 2.7 microns.

Using the thermal radiation data produced by the pyrometers, the temperature of each wafer was calculated. Specifically, first the temperature of each wafer was calculated using the thermal radiation data sensed by the first pyrometer using conventional methods. The temperature of the wafer was then also calculated according to the process of the present invention as described above using not only the thermal radiation data collected within the highly reflective region but also collected within the low reflective region.

The following results were obtained:

TABLE 1

Calculated Temperatures of Wafers Heated to 823° C.

| Wafer | Emissivity | Temperature From the True Using 1st Pyrometer | Deviation Temperature using 1st and 2nd Pyrometers |
|---|---|---|---|
| 1 | 0.22 | −32 | −1.0 |
| 2 | 0.39 | −17 | 1.0 |
| 3 | 0.55 | −11 | 1.5 |
| 4 | 0.94 | −3 | −1.3 |

As shown above, the process of the present invention provided dramatic improvements in the ability to accurately determine the temperature of a heated wafer in comparison to conventional methods. Specifically, the temperature of a heated substrate can be much more accurately determined by sampling thermal radiation in regions of high reflectivity and low reflectivity than only sampling thermal radiation within areas of high reflectivity.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An apparatus for measuring the temperature of an object comprising:

a chamber adapted to receive an object;

a reflective device contained within said chamber, said reflective device being positioned so as to be placed adjacent to an object when said object is received within said chamber, said reflective device being configured to reflect thermal radiation being emitted by said object between a surface of said object and a surface of said device, said reflective device including at least a first areas a second area, and a third area, said first area having a greater reflectivity than said second area and said third area; and a radiation sensing device for sensing said reflected thermal radiation at a plurality of locations, said radiation sensing device sensing said thermal radiation within said first area, within said second area, and within said third area of said reflective device for determining the temperature of said object.

2. An apparatus as defined in claim 1, further comprising a heat source in communication with said chamber for heating objects contained within said chamber, said heat source comprising at least one lamp.

3. An apparatus as defined in claim 2, further comprising a filter positioned between said heat source and said chamber for substantially preventing light at a preselected wavelength from entering said chamber.

4. An apparatus as defined in claim 3, wherein said radiation sensing device senses said thermal radiation at said preselected wavelength.

5. An apparatus as defined in claim 4, further comprising a controller in communication with said radiation sensing device and with said heat source, said controller being configured to receive thermal radiation information from said radiation sensing device and, based on said information, to control the amount of heat being emitted by said heat source.

6. An apparatus as defined in claim 1, wherein said reflective device comprises a substrate coated within said first area with a first dielectric film and coated with at least a second dielectric film within said second area and said third area.

7. An apparatus as defined in claim 1, wherein said reflective device comprises a substrate coated with a dielectric film, and wherein said second area is defined by an opening located within said film.

8. An apparatus as defined in claim 1, wherein said first area of said reflective device comprises a plate having a highly reflective surface, and wherein said second area of said reflective device is created by placing a partial light transmitting mirror over a portion of said reflective surface.

9. An apparatus as defined in claim 1, wherein said second area and said third area are smaller in size than said first area of said reflective device.

10. An apparatus as defined in claim 9, wherein said reflective device further includes a fourth area having a reflectivity lower than said first area, said fourth area being smaller in size than said first area of said reflective device, said radiation sensing device sensing said thermal radiation within said fourth area for determining the temperature of said object.

11. An apparatus as defined in claim 1, wherein said reflective device includes at least five distinct areas having a reflectivity lower than said first area, said radiation sensing device sensing said thermal radiation at each of said five areas for determining the temperature of said object.

12. An apparatus for measuring the temperature of a semiconductor wafer comprising:

a chamber adapted to receive said semiconductor wafer;

a heat source in communication with said chamber for heating said semiconductor wafer when contained therein;

a reflective device positioned within said chamber, said reflective device including a reflective surface being spaced a predetermined distance from said wafer, said reflective surface being configured to reflect thermal radiation being emitted by said wafer between a surface of said wafer and said reflective surface, said reflective surface including at least two areas having a reflectivity lower than the remainder of said reflective surface; and a radiation sensing device for sensing said thermal radiation being emitted by said semiconductor wafer at a plurality of locations, said radiation sensing device sensing said thermal radiation within said at least two areas and outside said at least two areas upon said reflective surface, wherein said thermal radiation being sensed at said plurality of locations is used to determine the temperature of said wafer.

13. An apparatus as defined in claim 10, wherein said reflective surface has a reflectivity of greater than 0.9 and wherein said at least two areas have a reflectivity of from about 0.2 to about 0.7.

14. An apparatus as defined in claim 12, wherein said heat source comprises at least one lamp and wherein said apparatus further includes a filter positioned between said heat source and said chamber for substantially preventing light at a preselected wavelength from entering said chamber, said radiation sensing device sensing thermal radiation at said preselected wavelength.

15. An apparatus as defined in claim 14, wherein said filter comprises a quartz window for substantially preventing light from entering said chamber at a wavelength of from about 2.7 microns to about 2.8 microns.

16. An apparatus as defined in claim 14, further comprising a controller in communication with said radiation sensing device and with said heat source, said controller receiving thermal radiation information sensed by said radiation sensing device for determining the temperature of said wafer, said controller, based on said determined temperature, controlling the amount of heat being emitted by said heat source.

17. An apparatus as defined in claim 12, wherein said radiation sensing device comprises a plurality of pyrometers.

18. An apparatus as defined in claim 12, wherein said reflective surface of said reflective device comprises a first multi-layer dielectric film defining said at least two areas and a second multi-layer dielectric film defining the remainder of said reflective surface.

19. An apparatus for measuring and controlling the temperature of a semiconductor wafer comprising:

a chamber adapted to received said semiconductor wafer;

a heat source in communication with said chamber for heating said semiconductor wafer when contained therein;

a filter position between said heat source and said chamber for substantially preventing light at a preselected wavelength from entering said chamber;

a reflective device positioned within said chamber, said reflective device including a reflective surface being spaced a predetermined distance from said wafer, said reflective surface being configured to reflect thermal radiation being emitted by said wafer between a surface of said wafer and said reflective surface, said reflective surface including at least a first area, a second area and a third area, said second area and said third area having a reflectivity lower than said first area of said reflective surface;

a radiation sensing device for sensing said thermal radiation being emitted by said semiconductor wafer at said preselected wavelength, said radiation sensing device sensing said thermal radiation within at least said first area, within said second area, and within said third area upon said reflective surface; and a controller in communication with said radiation sensing device and with said heat source, said controller receiving thermal radiation information sensed by said radiation sensing device for determining the temperature of said wafer, said controller, based on said determined temperature, controlling the amount of heat being emitted by said heat source.

20. An apparatus as defined in claim 19, wherein said reflective surface of said reflective device is substantially parallel to said surface of said wafer.

21. An apparatus as defined in claim 19, wherein said filter comprises a quartz window for preventing light from entering said chamber at a wavelength of from about 2.7 micrometers to about 2.8 micrometers.

22. An apparatus as defined in claim 19, wherein said radiation sensing device comprises a plurality of pyrometers and wherein said reflective device comprises a substrate coated with a first dielectric film within said first area and at least a second dielectric film within said second area and said third area on said reflective surface, said first dielectric film having a reflectivity of greater than 0.9 and said second dielectric film having a reflectivity of from about 0.2 to about 0.7.

23. An apparatus as defined in claim 19, wherein said second area and said third area of said reflective surface comprise low reflective zones surrounded by said first area, said second area and said third area being smaller than said first area.

24. A method for measuring the temperature of a radiating body comprising the steps of:

providing a radiating body;

positioning a reflective device adjacent to a surface of said radiating body, said reflective device including a reflective surface facing said surface of said radiating body, said reflective surface including a first area having a first reflectivity, a second area having a second reflectivity, and a third area having a third reflectivity said first reflectivity being greater than said second reflectivity and said third reflectivity, said reflective surface causing thermal radiation being emitted by said radiating body to reflect between said surface of said radiating body and said reflective surface; and sensing the thermal radiation being emitted by said radiating body within said first area, within said second area and within said third area for determining the temperature of said radiating body.

25. A method as defined in claim 24, wherein said thermal radiation being emitted by said radiating body is sensed at a preselected wavelength.

26. A method as defined in claim 24, wherein said second area and said third area of said reflective surface are smaller in size then said first area.

27. A method as defined in claim 24, wherein said first area of said reflective surface has a reflectivity greater then 0.9 and wherein said second area and said third area of said reflective surface have a reflectivity of from about 0.2 to about 0.7.

28. A method as defined in claim 24, wherein said reflective device comprises a substrate coated within said first area by a first dielectric film and coated within said second area by a second dielectric film.

29. A method as defined in claim 26, wherein said reflective surface further comprises a fourth area having a reflectivity lower than said reflectivity of said first area, said fourth area being smaller in size than said first area, wherein the thermal radiation being emitted by said radiating body is also sensed within said fourth area for determining the temperature of said radiating body.

* * * * *